United States Patent [19]
Gerlich

[11] 3,890,986
[45] June 24, 1975

[54] TEETH CLEANING UNIT
[75] Inventor: Irvin V. Gerlich, West Des Moines, Iowa
[73] Assignee: Den-Tal-Ez Mfg. Co., Des Moines, Iowa
[22] Filed: July 12, 1974
[21] Appl. No.: 487,834

Related U.S. Application Data
[63] Continuation of Ser. No. 346,139, April 29, 1973.

[52] U.S. Cl. .............................. 132/84 A; 206/63.5
[51] Int. Cl. ...................... A65d 44/18; A61l 17/02
[58] Field of Search......... 132/84 R, 84 A; 206/225, 206/226, 238, 38, 63.5; 221/30; 222/84; 242/125.2

[56] References Cited
UNITED STATES PATENTS
1,473,766  11/1923  Healy................................ 132/84 A
1,646,082  10/1927  Dailey............................... 132/84 A
2,233,522   3/1941  Fickle................................ 132/84 A Primary Examiner—William I. Price
Assistant Examiner—Douglas B. Farrow
Attorney, Agent, or Firm—Rudolph L. Lowell

[57] ABSTRACT

A tooth brush has a hollow open ended handle section for receiving a spool of dental floss. A removable cap member for closing the handle section has a cutting blade embedded in the cap member within the confines of the outer surface thereof and adjacent a cutaway portion in such outer surface. The handle section and cap member are relatively formed to provide for the withdrawal of dental floss from the handle section and across the outer surface of the cap member for severance at the cutting member.

5 Claims, 6 Drawing Figures

PATENTED JUN 24 1975 3,890,986

TEETH CLEANING UNIT

This is a continuation of application Ser. No. 346,139, filed Apr. 29, 1973.

SUMMARY OF THE INVENTION

The tooth cleaning unit is of a compact construction, capable of a normal use for brushing the teeth, and includes in the handle section thereof a readily accessible supply of dental floss that can be successively withdrawn from the unit for severance into any length desired. The floss cutting member is carried within the dimensional confines of the handle section of the cleaning unit so as to eliminate any accidental injury or cutting of fingers in the handling of the cleaning unit, and is capable of readily severing the floss by merely pulling the floss against a cutting section thereof. Concurrently with the cutting action a leading section of the floss is left exposed at a position to be conveniently gripped for a later withdrawal of a next length of floss from the floss supply in the handle section.

DETAILED DESCRIPTION OF THE INVENTION

Figure 1:
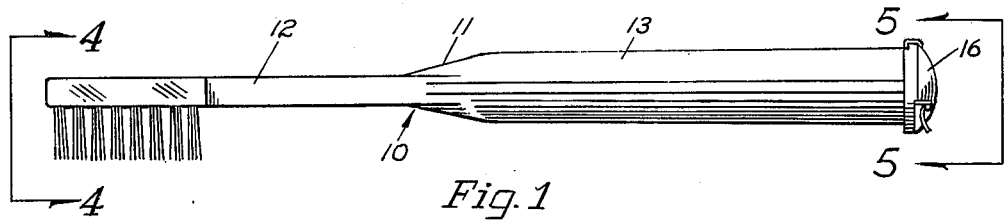
FIG. 1 is a side elevational view of the cleaning unit of this invention.

Referring to the drawing, there is illustrated in FIG. 1 a tooth cleaning unit 10 comprised of an elongated body member 11 integrally formed with a brush section 12 of a rectangular shape in transverse cross section and a hollow handle section 13 of a cylindrical tubular shape having an open outer end 14. The closure or cap member 16 for the handle section outer end 14 has a substantially dome shape head portion 17 and a tubular cylindrical shaped stem portion 18 of a reduced diameter and of a size to fit snugly or frictionally within the outer end 14 and into the axial bore or space 19 of the hollow handle section 13. The head portion 17 has an under surface 21 which defines the junction thereof with the stem portion 18. Engagement of this under surface 21 with the terminal face 22 of the handle section outer end 14 determines or limits the inserted position of the stem portion 18 within the axial bore 19.

The outer peripheral surface of the stem portion 18 is formed with an axially extended groove 23 (FIG. 6) arranged relative to a radial groove 24 in the under surface 21 so as to form therewith a continuous passage open to the space 19 when the cap member 16 is inserted within the handle section 13.

Figure 4:
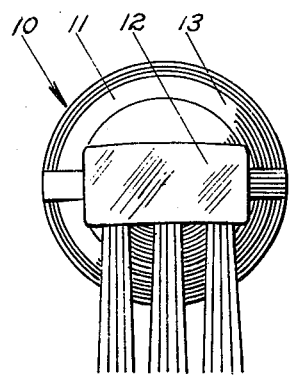
FIG. 4 is an enlarged end elevational view of the cleaning unit as seen on line 4—4 in FIG. 1.
Figure 5:
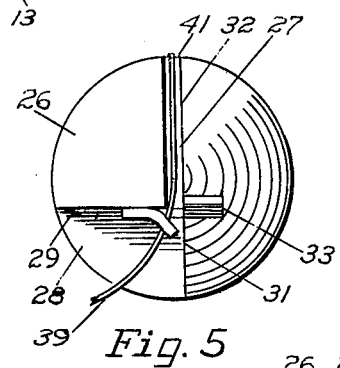
FIG. 5 is an enlarged end elevational view of the cleaning unit taken on line 5—5 in FIG. 1.

The outer or dome surface 26 of the head portion 17 is formed with a radially extended groove 27 at a position laterally or axially opposite the radial groove 24 in the under surface 21. A quadrant-like segment 28 of the head portion 17 is cutaway so as to form in the cap member 16 a first side wall 29 (FIGS. 3-5) in a plane normal to the radial groove 27 at a position adjacent the inner end of such radial groove and a second side wall 31 arranged substantially in the plane of the side wall 32 of the radial groove 27 so as to form with the side wall 32 a continuous wall surface extended diametrically of the head portion 17.

Figure 2:
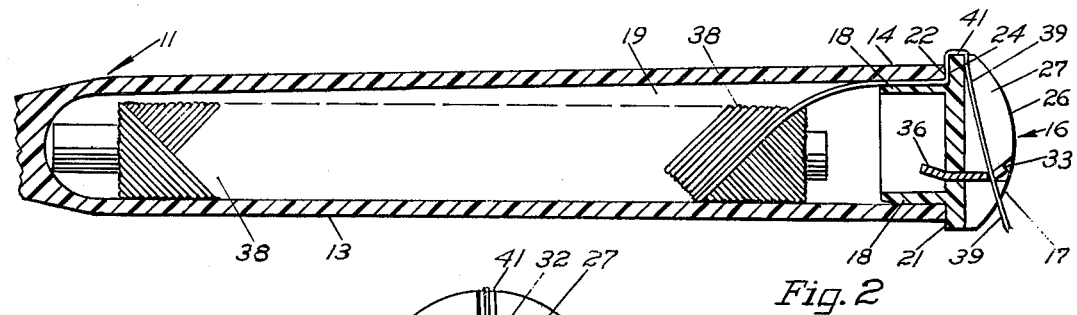
FIG. 2 is an enlarged longitudinal sectional view of the hollow handle section of the cleaning unit.
Figure 6:
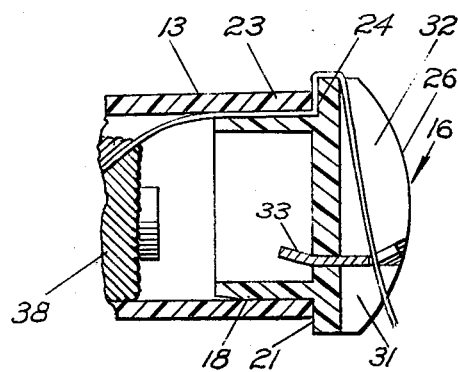
FIG. 6 is an enlarged sectional view showing of the outer end of the hollow handle section illustrated similarly to the showing thereof in FIG. 2.

A flat metal cutter member 33, embedded within the head portion 17 at a position substantially in the plane of the side wall 29 of the cutaway 28, has a cutter section 34 located at the inner end of the radial groove 24. Stated otherwise, the inner end of the radial groove 24 is closed by the cutter member 33. As best appears in FIG. 6, the inner or embedded end 36 of the cutter member 33 is extended within the tubular stem portion 18 and laterally bent relative to the main portion of the cutter member to hold the cutter member against being pulled outwardly from the head portion 17. The cutter section 34 is formed by merely cutting a tongue 37 (FIGS. 3 and 5) from the body portion of the cutter member 33 and then bending such tongue laterally outwardly. As shown in FIGS. 2 and 6, the cutter member 33 is arranged entirely within the confines of the head portion outer surface 26 so as to completely eliminate the occurrence of any accidental injury from the cutter member in the handling and use of the tooth cleaning unit 10.

Figure 3:
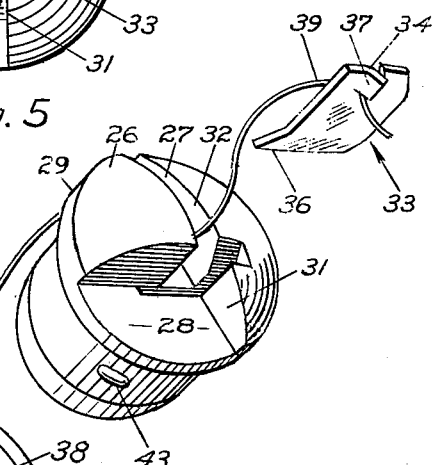
FIG. 3 is an enlarged exploded perspective view of the outer end of the handle section and a cap closure therefor.

The axial bore or space 19 in the handle 13 is of a size to receive therein an elongated spool of dental floss 38 having a leading end section 39 positionable within the continuous passage formed by the grooves 23 and 24 and extendible over the peripheral edge section 41 (FIG. 6) of the head portion 17 and within the radial groove 27 for extension across the cutter section 34 of the cutter member 33. By virtue of the location of the floss section 39 within the angulate path defined by the grooves 23, 24, 27 and the peripheral edge section 41, the floss is substantially held against movement from the spool 38 when being severed at the cutting section 34. This severance of the floss takes place by merely drawing the leading end 39 downwardly of the tongue member 37, as illustrated in FIG. 3, and then pulling the extended length of floss transversely of the cutter member. This transverse movement is permitted by the working space provided at the cutaway segment 28. Movement of the floss lengthwise of the radial groove 27 during a severance operation may be positively precluded by merely pressing the finger of one hand against the floss at the peripheral edge section 41 and using the other hand for severing purposes.

The cap member 16 is releasably locked in its inserted position within the open outer end 14 of the handle section 13 by the provision of a dimple or recess 42 (FIG. 3) formed in the side wall of the bore 19 at a position adjacent the terminal face 22. The dimple is of a size to frictionally receive a corresponding bead 43 formed on and projected outwardly from the outer peripheral surface of the stem portion 18. It is contemplated that the body member 11 and cap member 16 be constructed of a plastic material and the cutter member 33 of a metal material.

In use, the tooth cleaning unit is operable in the usual manner as a tooth brush by gripping the handle section 13. On completion of a brushing operation, the brush is conveniently available for use as a dental floss dispenser. The tooth cleaning unit thus makes available in a compact and unit package everything necessary for the proper care and cleaning of the teeth and gums.

Although the invention has been described with respect to a preferred embodiment thereof, it is to be understood that it is not to be so limited since changes and modifications can be made therein which are within the full intended scope of this invention as defined by the appended claims.

I claim:

1. A teeth cleaning unit including in combination:
   a. an elongated body member having a brush section and a hollow cylindrical handle section open at the outer end thereof,
   b. a cap member for said open outer end including a head section and a stem section, said head section having an under surface and said stem section receivable within said handle section through said open outer end to a closing position defined by the engagement of said under surface with the terminal face of said handle section outer end,
   c. said stem section having an axial groove and said under surface a radial groove relatively arranged to form a single continuous groove,
   d. said head section having an outer surface formed with a radial groove located laterally opposite the radial groove in said under surface,
   e. a flat cutter member embedded in the outer surface of said head section extended transversely of the radial groove in said outer surface, including a cutting section located at the inner end of said last mentioned radial groove, and
   f. a spool of dental floss within said hollow handle section having a leading end extendible through said continuous groove, and the radial groove in said outer surface for travel over said cutting section.

2. The teeth cleaning unit according to claim 1 wherein:
   a. said outer surface has a cutaway quadrant segment with a first side wall substantially in the plane of said cutter member and a second side wall forming with a side wall of the radial groove in said outer surface a continuous diametrically extended side wall,
   b. said cutter member arranged within the confines of said outer surface.

3. The teeth cleaning unit according to claim 1, including:
   a. coacting locking means on said stem section and handle section for releasably locking said cap member in the closing position therefor.

4. A teeth cleaning unit including in combination:
   a. an elongated body member having a brush section and a hollow cylindrical handle section open at the outer end thereof,
   b. a cap member for said open outer end including a head section and a stem section, said head section having an outer surface and an under surface and said stem section receivable within said handle section through said open outer end to a closing position defined by the engagement of said under surface with the terminal face of said handle section outer end,
   c. said stem section having an axial groove and said under surface a radial groove relatively arranged to form a single continuous groove,
   d. a flat cutter member on the outer surface of said head section adjacent the central portion thereof and positioned transversely of a plane extended longitudinally of said radial groove, and
   e. a spool of dental floss within said hollow handle section having a leading end section extendible through said continuous groove.

5. The teeth cleaning unit according to claim 4 wherein:
   a. said continuous groove, when the cap member is in the closing position therefor, coacting with adjacent opposite portions of said terminal face and inner peripheral surface of said handle section to form a continuous passage way for the leading end section of said floss.

* * * * *